(12) United States Patent
Li et al.

(10) Patent No.: US 10,563,694 B2
(45) Date of Patent: Feb. 18, 2020

(54) SLIDING BEARING, DRIVING DEVICE, AND IMAGE FORMING APPARATUS

(71) Applicant: SHARP KABUSHIKI KAISHA, Sakai, Osaka (JP)

(72) Inventors: Zhaotong Li, Sakai (JP); Norio Tomita, Sakai (JP); Masaki Amemiya, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/628,731

(22) Filed: Jun. 21, 2017

(65) Prior Publication Data
US 2017/0370408 A1   Dec. 28, 2017

(30) Foreign Application Priority Data
Jun. 22, 2016   (JP) .................. 2016-123139

(51) Int. Cl.
| | |
|---|---|
| *F16C 27/02* | (2006.01) |
| *F16C 17/02* | (2006.01) |
| *F16C 35/02* | (2006.01) |
| *F16C 33/08* | (2006.01) |
| *F16C 13/02* | (2006.01) |
| *F16C 32/06* | (2006.01) |
| *G03G 21/16* | (2006.01) |
| *G03G 15/16* | (2006.01) |
| *G03G 15/00* | (2006.01) |

(52) U.S. Cl.
CPC .............. *F16C 27/02* (2013.01); *F16C 13/02* (2013.01); *F16C 17/02* (2013.01); *F16C 32/0677* (2013.01); *F16C 33/08* (2013.01); *F16C 35/02* (2013.01); *G03G 21/1647* (2013.01); *F16C 2226/74* (2013.01); *F16C 2324/16* (2013.01); *G03G 15/167* (2013.01); *G03G 15/1615* (2013.01); *G03G 15/751* (2013.01); *G03G 15/757* (2013.01); *G03G 2221/1657* (2013.01)

(58) Field of Classification Search
CPC .......... F16C 13/02; F16C 17/02; F16C 27/02; F16C 32/0677; F16C 33/08; F16C 2324/16
USPC .................................................. 384/295, 296
See application file for complete search history.

(56) References Cited

U.S. PATENT DOCUMENTS

| | | | | |
|---|---|---|---|---|
| 2005/0091829 | A1* | 5/2005 | Yoon ........................ | F16C 33/08 29/509 |
| 2008/0240636 | A1* | 10/2008 | Uehara .................... | F16C 17/02 384/440 |
| 2009/0052821 | A1* | 2/2009 | Hartmann ............... | B60S 1/166 384/295 |

FOREIGN PATENT DOCUMENTS

| | | |
|---|---|---|
| JP | H08-277844 A | 10/1996 |
| JP | 2002-340001 A | 11/2002 |

* cited by examiner

*Primary Examiner* — James Pilkington
(74) *Attorney, Agent, or Firm* — ScienBiziP, P.C.

(57) ABSTRACT

A sliding bearing is made of a resin and includes a tubular portion that includes an outer peripheral surface including a D-cut surface. A flange portion, which protrudes from the D-cut surface, is formed at one end portion of the tubular portion. An engagement portion is formed at the other end portion of the tubular portion. A protruding portion is formed on the outer peripheral surface of the tubular portion at a circumferential position that is outside a region in which the D-cut surface is formed and that is outside a region in which the engagement portion is formed.

6 Claims, 12 Drawing Sheets

SLIDING BEARING, DRIVING DEVICE, AND IMAGE FORMING APPARATUS

CROSS-REFERENCE TO RELATED APPLICATIONS

The present disclosure contains subject matter related to that disclosed in Japanese Priority Patent Application JP 2016-123139 filed in the Japan Patent Office on Jun. 22, 2016, the entire contents of which are hereby incorporated by reference.

BACKGROUND

1. Field

The present disclosure relates to a sliding bearing, a driving device, and an image forming apparatus. In particular, the present disclosure relates to a sliding bearing that is to be inserted to a through-hole formed in a support plate to rotatably support a shaft of a rotational body and that is made of a resin; a driving device including the sliding bearing; and an image forming apparatus including the driving device.

2. Description of the Related Art

Press-fit sliding bearings that are made of a resin have been used as bearings for transport rollers of image forming apparatuses. A press-fit sliding bearing includes, for example, a tubular portion, which is fitted into a through-hole formed in a support plate, and a flange, which extends outward from an outer peripheral surface of one end portion of the tubular portion. The outer diameter of the tubular portion of the press-fit sliding bearing is larger than the diameter of the through-hole so that the tubular portion can be tightly fitted into the through-hole. Therefore, the sliding bearing can be fixed to the support plate by only pressing the tubular portion into the through-hole. However, it is necessary to apply a large force to press the tubular portion of the press-fit sliding bearing into the through-hole.

Japanese Unexamined Patent Application Publication No. 2002-340001 describes a plane bearing that includes a tubular portion and a flange portion and that is made of a resin. An elastic engagement piece is integrally formed with the outer peripheral surface of the tubular portion. When passing through the through-hole, the elastic engagement piece becomes elastically displaced toward the inside of the tubular portion. After passing through the through-hole, the elastic engagement piece becomes elastically displaced toward the outside of the tubular portion. With the technology described in Japanese Unexamined Patent Application Publication No. 2002-340001, the sliding bearing can be inserted in the through-hole with a small force since the elastic engagement piece is formed in the tubular portion of the sliding bearing.

In the sliding bearing described in Japanese Unexamined Patent Application Publication No. 2002-340001, a rectangular through-hole is formed in a side wall of the tubular portion, and the elastic engagement piece protrudes from an inner peripheral surface of the through-hole so as to expand toward the flange portion. However, it is difficult to manufacture the sliding bearing having such an elastic engagement piece and the sliding bearing is not practical. Improvement can be made in the art.

SUMMARY

A sliding bearing, a driving device, and an image forming apparatus is provided.

It is also preferable to provide a sliding bearing that can be easily and stably inserted in a through-hole of a support plate, a driving device including the sliding bearing, and an image forming apparatus including the driving device.

According to a first aspect of the disclosure, a sliding bearing is inserted in a through-hole formed in a support plate and that is made of a resin. The sliding bearing includes a tubular portion that includes an outer peripheral surface, a flange portion that is formed at one end portion of the tubular portion and protrudes from the D-cut surface; an engagement portion that protrudes from a part of the outer peripheral surface of the tubular portion at the other end portion of the tubular portion; and a protruding portion formed on the outer peripheral surface of the tubular portion at a circumferential position that is outside a region in which the D-cut surface is formed and that is outside a region in which the engagement portion is formed.

According to a second aspect of the disclosure, there is provided a sliding bearing that is to be inserted in a through-hole formed in a support plate and that is made of a resin. The sliding bearing includes a tubular portion that includes an outer peripheral surface including a D-cut surface; a flange portion that is formed at one end portion of the tubular portion and protrudes from the D-cut surface; and a protruding portion that is formed on an end portion of the D-cut surface in a direction perpendicular to an axial direction of the tubular portion.

DESCRIPTION OF THE EXEMPLARY EMBODIMENTS

First Exemplary Embodiment

Figure 1:
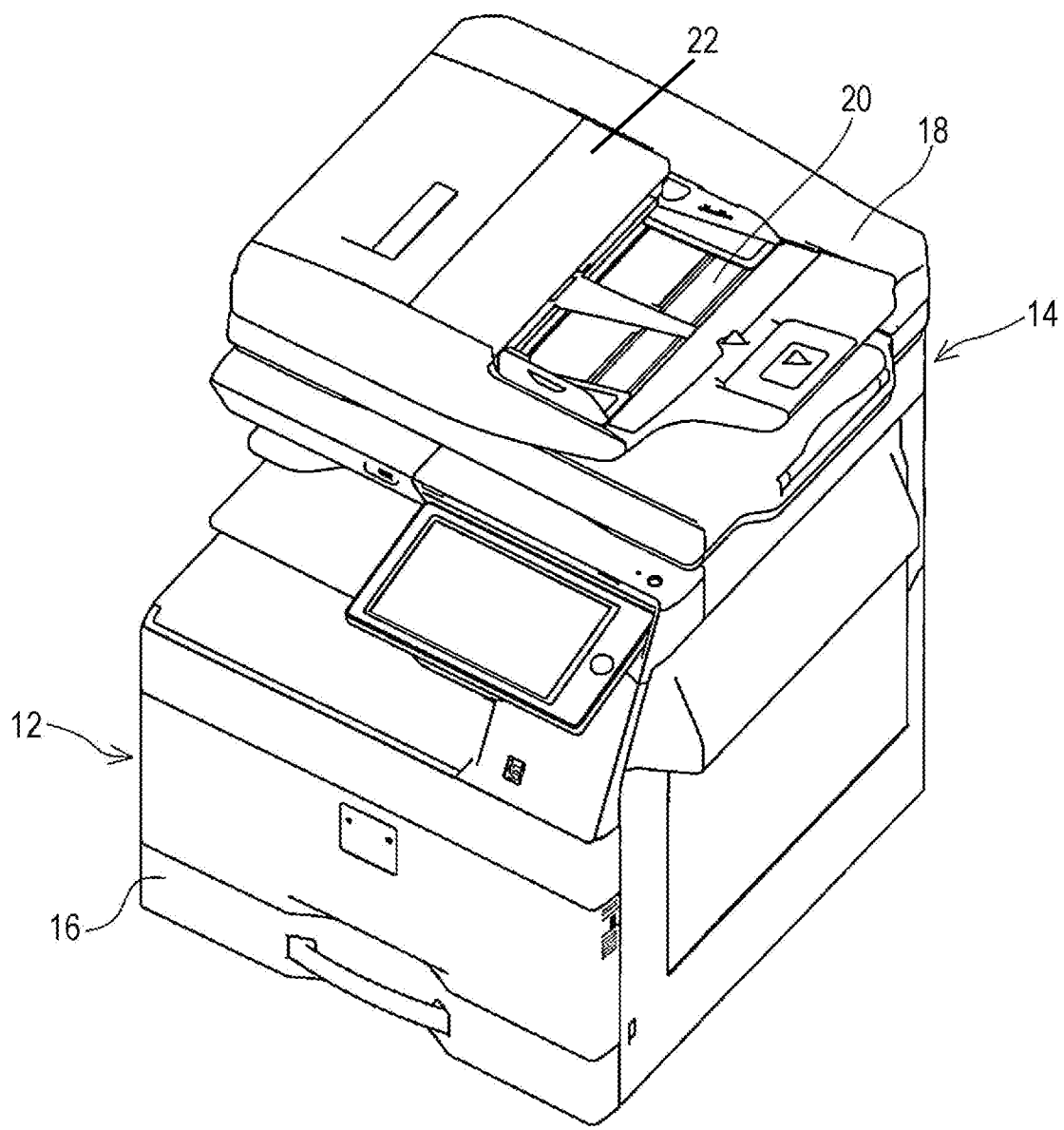
FIG. 1 is a perspective view of an image forming apparatus including a sliding bearing according to a first exemplary embodiment of the present disclosure.
Figure 2A:
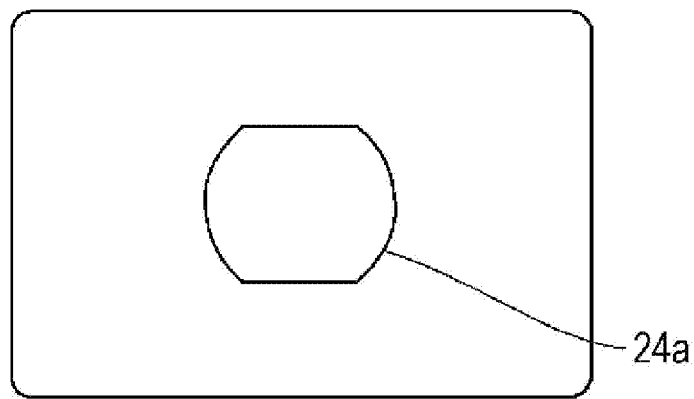
FIG. 2A illustrates a through-hole of a support plate in the image forming apparatus.
Figure 2B:
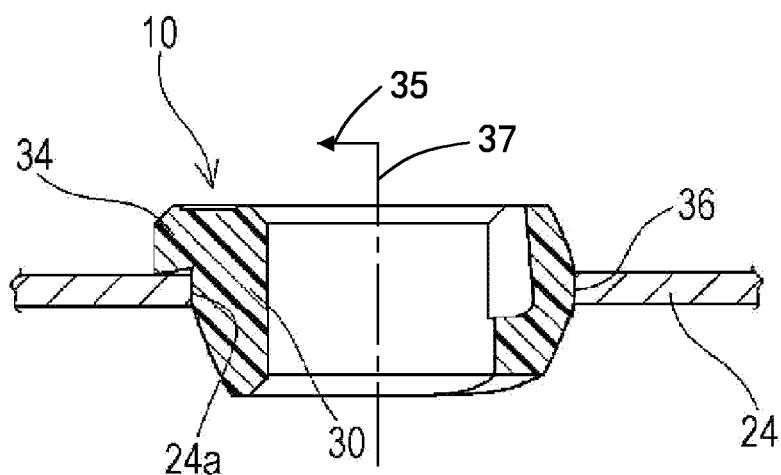
FIG. 2B illustrates a sliding bearing inserted in the through-hole of the support plate of FIG. 2A.

Referring to FIGS. 1 to 2B, a sliding bearing 10 according to a first exemplary embodiment of the present disclosure is inserted to a through-hole 24a, which is formed in a support plate 24 (metal plate). The support plate 24 is included in a sheet feed mechanism of an image forming apparatus 100. The sliding bearing 10 rotatably supports a transport roller (not shown).

Note that the sliding bearing 10 can be also used as a bearing for a rotational body of another driving device of the image forming apparatus 100, such as a photoconductor drum, a developing roller, a tension roller that applies a tension to an intermediate transfer belt, a transfer roller, or a fixing roller.

First, the basic structure of the image forming apparatus 100 will be schematically described. As illustrated in FIG. 1, in the first exemplary embodiment, the image forming apparatus 100 is a multifunction peripheral (MFP), which functions as a copier, a printer, a scanner, a facsimile, and the like. The image forming apparatus 100 includes an image forming unit 12 and an image scanner 14 disposed above the image forming unit 12.

The image forming unit 12 can include an exposure unit, a developing unit, a photoconductor drum, a charger, an intermediate transfer belt, a transfer roller, and a fixing unit. The exposure unit, the developing unit, the photoconductor drum, the charger, the intermediate transfer belt, the transfer roller, and the fixing unit are not shown in the drawings and are only described herein to provide background in the disclosure. A sheet feed mechanism (not shown) transports a sheet to the image forming unit 12 from a sheet feed cassette 16, which is disposed below the image forming unit 12. The image forming unit 12 forms an image on the sheet by using an electrophotographic method. Specifically, the image forming unit 12 functions as follows: the charger and the exposure unit form an electrostatic latent image on the photoconductor drum. The developing unit develops the electrostatic latent image on the photoconductor drum into a toner image. The intermediate transfer belt and the transfer roller transfer the toner image, which has been formed on the photoconductor drum, to the sheet. The fixing unit thermally fixes the toner image, which has been transferred to the sheet, onto the sheet. The sliding bearing 10 is used in the sheet feed mechanism of the image forming unit 12, and the sliding bearing 10 rotatably supports the shaft of a transport roller or the like of the sheet feed mechanism.

The image scanner 14 includes a housing that has a document table (both not shown), which is made of a transparent material, on the upper surface thereof. A light source, a plurality of mirrors, an image-forming lens, and a line sensor (all are not shown) are disposed in the housing. In the image scanner 14, a light source (not shown) emits light toward a document surface (not shown), and the plurality of mirrors guide reflected light, which is reflected from the document surface, toward the imaging lens. The imaging lens focuses the reflected light to a light-receiving element (not shown) of the line sensor. The line sensor detects the brightness and the chromaticity of the reflected light, the reflected light is focused on the light-receiving element, and the line sensor generates image data based on the image on the document surface. As the line sensor, a charge coupled device (CCD), a contact image sensor (CIS), or the like is used. The aforementioned elements not shown and described herein are only to provide background in the disclosure.

A platen cover 18, which can be opened or closed, is attached to the upper surface of the image scanner 14 through hinges, and hinges are disposed in a rear part of the image scanner 14. The platen cover 18 includes an automatic document feeder (ADF) 22. The ADF 22 automatically feeds documents, which are placed on a document tray 20, one by one to an image scanning position in the image scanner 14. The sliding bearing 10 is also used in a sheet feed mechanism (not shown) of the ADF 22 and rotatably supports the shaft of a transport roller of the ADF 22.

Figure 3A:
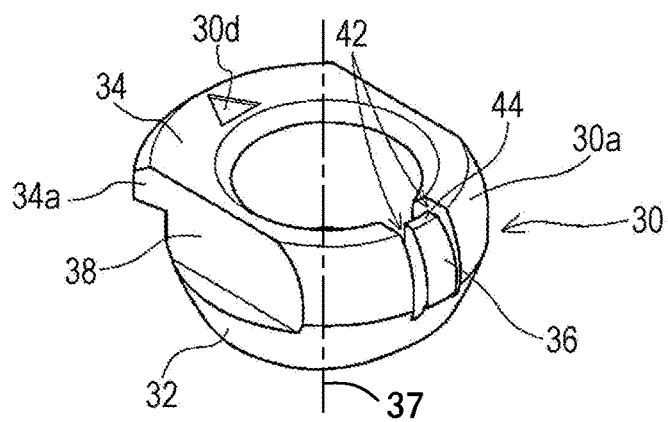
FIG. 3A is a perspective view.
Figure 3B:
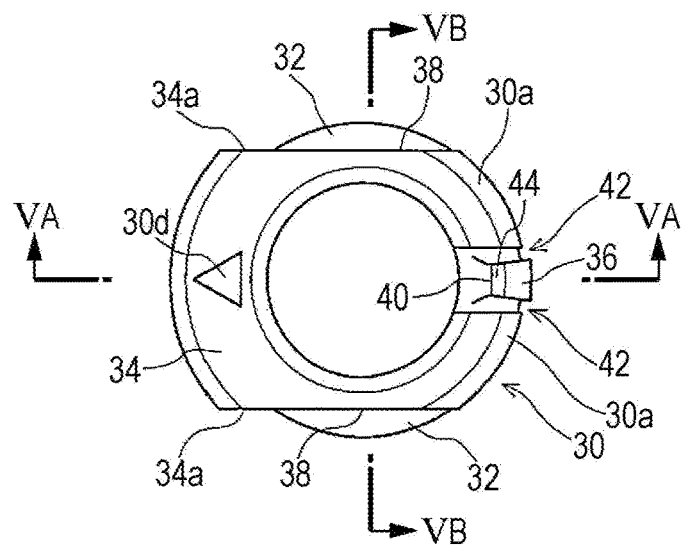
FIG. 3B is a planar view.
Figure 3C:
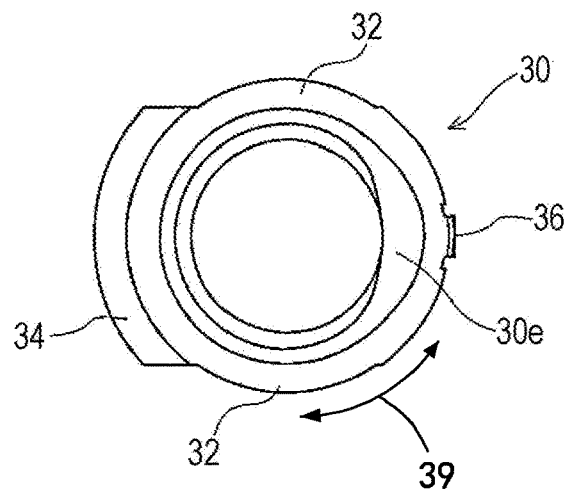
FIG. 3C is a bottom view of the sliding bearing according to the first exemplary embodiment of the present disclosure as shown in FIG. 2B.
Figure 4A:
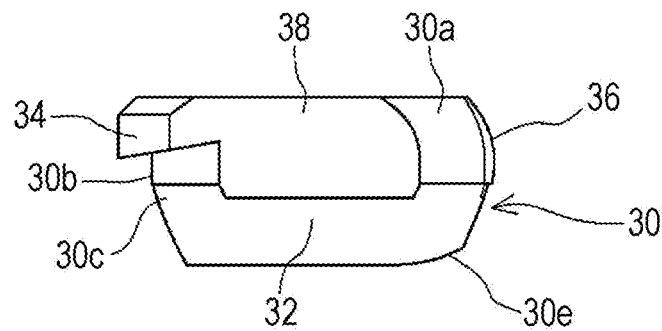
FIG. 4A is a front view.
Figure 4B:
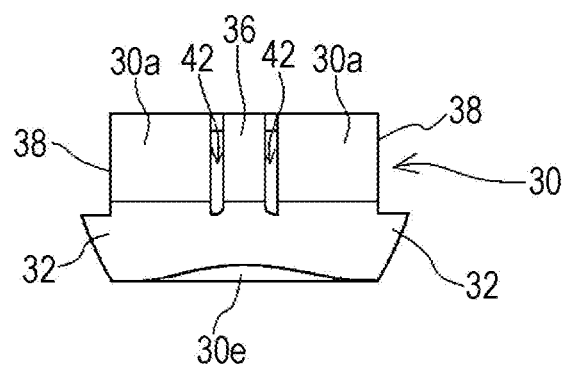
FIG. 4B is a right side view.
Figure 4C:
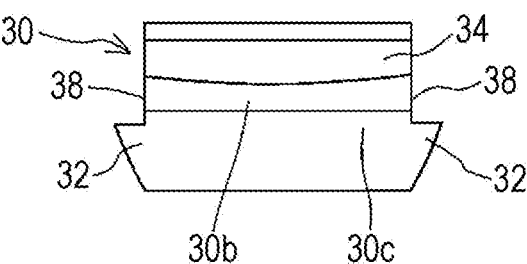
FIG. 4C is a left side view of the sliding bearing according to the first exemplary embodiment of the present disclosure as shown in FIG. 2A.

As illustrated in FIGS. 3A to 5B, the sliding bearing 10 includes a tubular portion 30, flange portions 32, an engagement portion 34, a protruding portion 36, and the like. The sliding bearing 10 is made of a synthetic resin, such as polyacetal, polyamide, or polyester. The sliding bearing 10 may be made of a synthetic resin that has wear resistance and a low friction coefficient. In the first exemplary embodiment, the sliding bearing 10 is made of polyacetal including a lubricant additive. The line 37 shown in FIGS. 2B and 3A is a center line of the sliding bearing 10. The axial direction is a direction in which the center line extends. For convenience of description, in an axial direction of the tubular portion 30, a side of the tubular portion 30 on which the flange portions 32 are formed will be referred to as a lower side of the sliding bearing 10.

The tubular portion 30 has an outer shape and an outer size with which the tubular portion 30 can be tightly fitted into the through-hole 24a of the support plate 24 (see FIGS. 2A and 2B). The tubular portion 30 has a substantially cylindrical shape. The outer peripheral surface of the tubular portion 30 includes two D-cut surfaces 38 that face in opposite directions. The D-cut surfaces 38 are flat surfaces that are parallel to the axial direction of the tubular portion 30. By forming the D-cut surfaces 38 in the outer peripheral surface of the tubular portion 30 and fitting the tubular portion 30 into the through-hole 24a, which has a shape corresponding to the outer shape of the tubular portion 30, the sliding bearing 10 is prevented from rotating. The inside diameter of the tubular portion 30 is, for example, in the range of 6 to 10 mm. The length of the tubular portion 30 in the axial direction is, for example, in the range of 4 to 6 mm. The sliding bearing 10 has a circumferential direction, and the circumferential direction of the sliding bearing 10 centers on the center line 37 of the sliding bearing as shown by the direction 39 in FIG. 3C. The sliding bearing 10 also has a region and an outside. The region is where the D-cut surface 38 is formed in the circumferential direction. The outside is a region other than the region in which D-cut surface 38 is formed in the circumferential direction. The thickness of the tubular portion 30 at a circumferential position that is outside the regions in which the D-cut surfaces 38 are formed is, for example, in the range of 2 to 4 mm.

The flange portions 32 are formed at one end portion (lower end portion) of the tubular portion 30. The flange portions 32 are D-shaped in planar view and each protrude outward from a corresponding D-cut surface 38. In other words, the D-cut surfaces 38 are formed in the outer peripheral surface of the tubular portion 30, excluding one end portion of the tubular portion 30, and the flange portions 32 are formed at the one end portion. The flange portions 32 restrict movement of the sliding bearing 10 in the axial direction by contacting one of surfaces (lower surface) of the support plate 24.

The engagement portion 34 is formed at the other end portion (upper end portion) of the tubular portion 30. The engagement portion 34 has an arc shape in planar view and protrudes from the outer peripheral surface of the tubular portion 30 at a circumferential position that is outside the regions in which the D-cut surfaces 38 are formed. In the first exemplary embodiment, the engagement portion 34 is formed so as to connect the D-cut surfaces 38 to each other. End surfaces 34a of the engagement portion 34 in the circumferential direction are flush with the D-cut surfaces 38. As described below, when attaching the sliding bearing 10 to the through-hole 24a of the support plate 24, the engagement portion 34 engages with the other surface (upper surface) of the support plate 24. The engagement portion 34 restricts movement of the sliding bearing 10 in the axial direction by contacting the other surface of the support plate 24.

The protruding portion 36 is formed so as to protrude from the outer peripheral surface of the tubular portion 30 at a circumferential position that is outside the regions in which the D-cut surfaces 38 are formed and outside a region in which the engagement portion 34 is formed. In the exemplary embodiment, the protruding portion 36 is formed at a circumferential position that is opposite to the engagement portion 34 so as to extend in the axial direction of the tubular portion 30. A recess 40 is formed in a back surface (inner peripheral surface) of the protruding portion 36. The recess 40 is recessed in the radial direction from the inner peripheral surface of the tubular portion 30. The radial direction is a direction 35 shown in FIG. 2B and is a direction extending from the center line 37 of the sliding bearing 10 to the outer peripheral surface of the tubular portion 30 of the sliding bearing 10. Slits 42 are formed on both sides of the protruding portion 36 in the circumferential direction of the tubular portion 30. The slits 42 extend in the axial direction from the upper end surface of the tubular portion 30. A claw-like portion 44 is formed between the slits 42. The claw-like portion 44, including the protruding portion 36, is elastically deformable in the radial direction of the tubular portion 30. In other words, the tubular portion 30 includes the claw-like portion 44 (elastic piece) at a circumferential position opposite to the engagement portion 34; the claw-like portion 44 stands in the axial direction of the tubular portion 30; and the protruding portion 36 is formed on the outer side of the claw-like portion 44.

The protruding height of each of the protruding portion 36 from the outer peripheral surface of the tubular portion 30 is, for example, 0.2 mm. The depth of the recess 40 is greater than the protruding height of the protruding portion 36. As described below, the protruding portion 36 presses the inner peripheral surface of the through-hole 24a of the support plate 24, thereby preventing accidental removal of the sliding bearing 10 from the through-hole 24a.

As with the outer surface of the protruding portion 36, a part of the outer peripheral surface of the tubular portion 30 opposite to the engagement portion 34 is a rounded surface 30a (has a rounded shape) having a diameter that increases toward the center of the tubular portion 30 in the axial direction. Thus, when attaching the sliding bearing 10 to the through-hole 24a of the support plate 24 as described below, the sliding bearing 10 can be easily rotated and inserted into the through-hole 24a. An upper part of the outer peripheral surface of the tubular portion 30 below the engagement portion 34 is a straight surface 30b that is parallel to the axial direction of the tubular portion 30. A lower part of the outer peripheral surface of the tubular portion 30 below the engagement portion 34 is a rounded surface 30c whose diameter decreases toward the bottom of the tubular portion 30 in the axial direction.

Figure 5A:
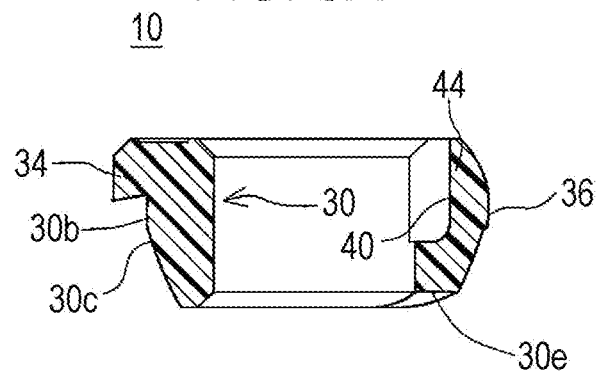
FIG. 5A is a cross-sectional view taken along line VA-VA of FIG. 3B.
Figure 5B:
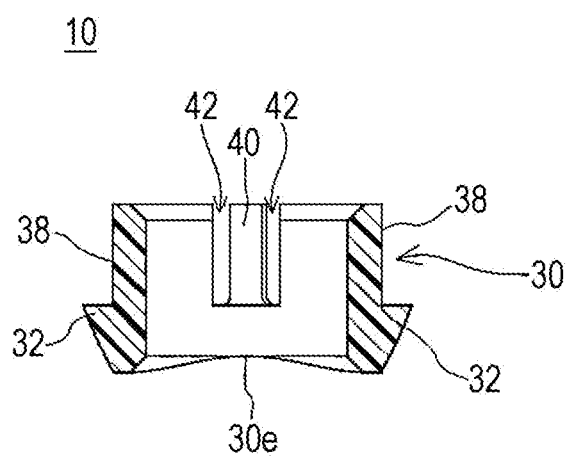
FIG. 5B is a cross-sectional view taken along line VB-VB of FIG. 3B of the sliding bearing according to the first exemplary embodiment of the present disclosure.

Moreover, an index mark 30d is formed on the upper surface of the engagement portion 34. The index mark 30d indicates a direction in which the sliding bearing 10 is to be inserted when attaching the sliding bearing 10 to the through-hole 24a of the support plate 24. In the first exemplary embodiment, the index mark 30d is a triangular recess. However, the shape of the index mark 30d may be changed as necessary. A recess 30e, having a curved shape, is formed in the lower surface of the tubular portion 30 below the protruding portion 36 as shown in FIGS. 5A and 5B. The recess 30e indicates a position at which the sliding bearing 10 is to be pressed when rotating and inserting the sliding bearing 10 into the through-hole 24a of the support plate 24. A user can easily push the sliding bearing 10 as the user's finger partially fits into the recess 30e having a curved shape.

Figure 6A:
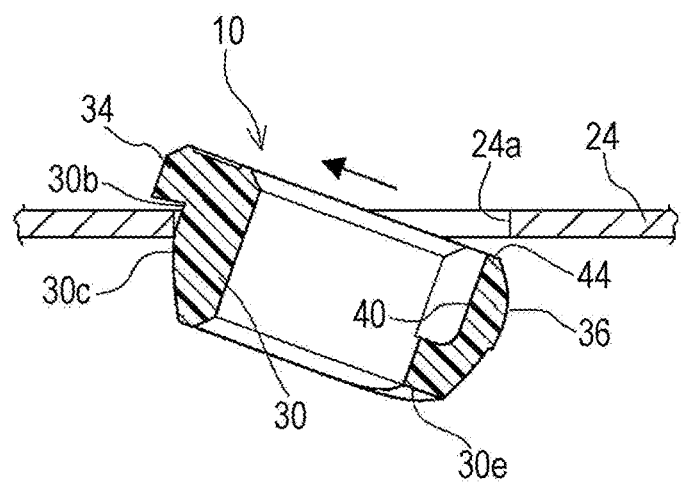
FIGS. 6A to 6C illustrate the sliding bearing, according to the first exemplary embodiment of the present disclosure, being attached to a support plate having a thickness of 0.8 mm.
Figure 6B:
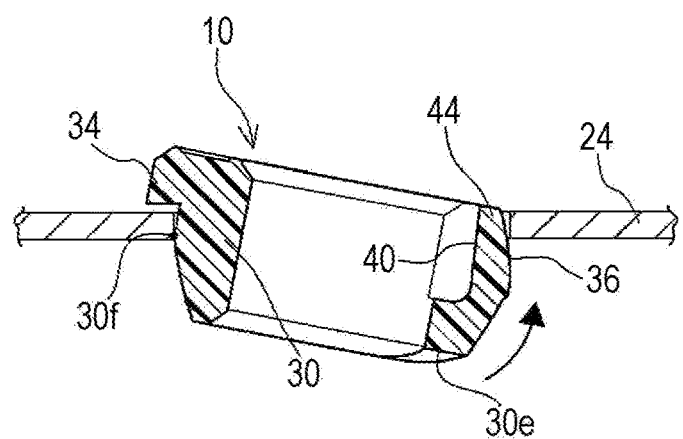
Figure 6C:
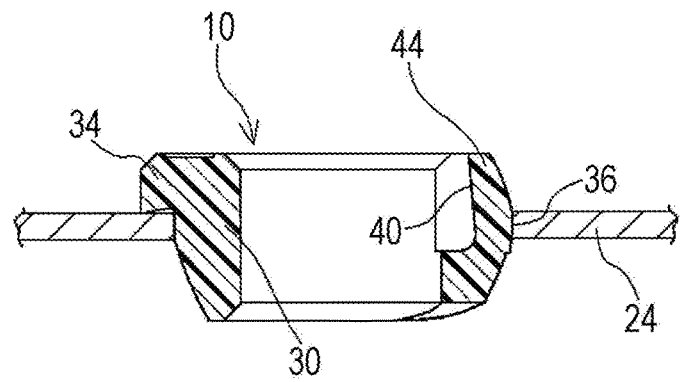

Next, a method of attaching the sliding bearing 10 to the through-hole 24a of the support plate 24 will be described. FIGS. 6A to 6C illustrate the sliding bearing 10 when it is being attached to a support plate 24 having a thickness of 0.8 mm.

First, as illustrated in FIG. 6A, the sliding bearing 10 is inserted diagonally into the through-hole 24a of the support plate 24 in such a way that the engagement portion 34 passes through the through-hole 24a, and the engagement portion 34 of the sliding bearing 10 engages with the edge of the through-hole 24a. However, at this time, the engagement portion 34 need not be in contact with the edge of the through-hole 24a.

Next, as illustrated in FIG. 6B, the recess 30e of the tubular portion 30 is pushed upward, so that the sliding bearing 10 is rotated and pressed into the through-hole 24a around a fulcrum 30f at the boundary between the straight surface 30b and the rounded surface 30c, which are located below the engagement portion 34. At this time, the protruding portion 36 is pressed by the inner peripheral surface of the through-hole 24a, and the claw-like portion 44 elastically deforms toward the axial of the tubular portion 30 by an amount corresponding to the protruding height of the protruding portion 36.

As illustrated in FIG. 6C, when the sliding bearing 10 is attached to the support plate 24 through the through-hole 24a, the inner peripheral surface of the through-hole 24a is pressed by the outer surface of the protruding portion 36 due to the elasticity of the claw-like portion 44. Thus, accidental removal of the sliding bearing 10 from the through-hole 24a can be reliably prevented.

Thus, when attaching the sliding bearing 10 to the through-hole 24a of the support plate 24, it is only necessary to engage the engagement portion 34 with the edge of the through-hole 24a and to rotate and insert the sliding bearing 10 into the through-hole 24a, and the force needed for insertion of the sliding bearing 10 is only a force for elastically deforming the claw-like portion 44. Accordingly, the sliding bearing 10 can be easily attached to the support plate 24 through the through-hole 24a Since the depth of the recess 40 is greater than the protruding height of the protruding portion 36, when the claw-like portion 44 elastically deforms toward the axial of the tubular portion 30, the claw-like portion 44 does not protrude from the inner peripheral surface of the tubular portion 30. That is, the shape of the inner peripheral surface of the tubular portion 30 is not affected by the elastic deformation of the claw-like portion 44, and the sliding bearing 10 can rotatably support the shaft of a rotational body, such as the transport roller, appropriately.

Figure 7A:
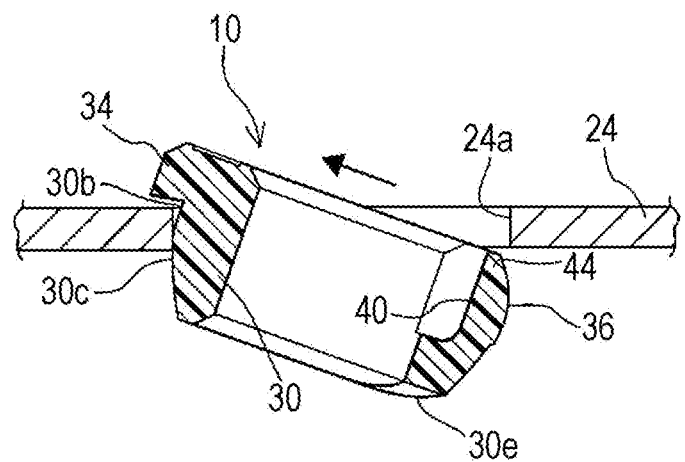
FIGS. 7A to 7C illustrate the sliding bearing, according to the first exemplary embodiment of the present disclosure, being attached to a support plate having a thickness of 1.2 mm.
Figure 7B:
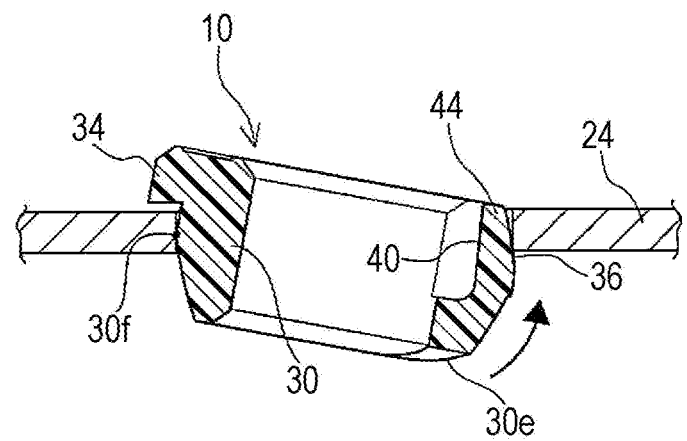
Figure 7C:
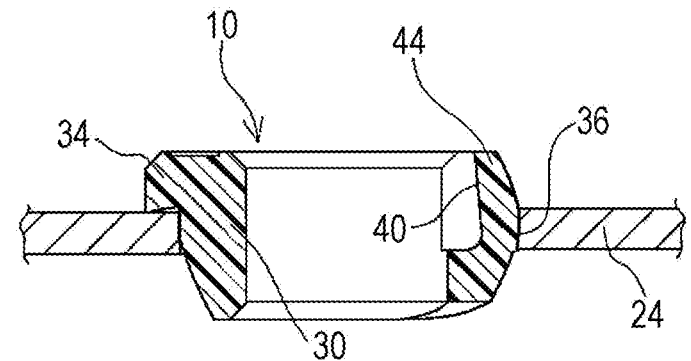

FIGS. 7A to 7C illustrate that the sliding bearing 10 is attached to a support plate 24 having a thickness of 1.2 mm. The sliding bearing 10 is attached to the support plate 24 having a thickness of 1.2 mm substantially in the same way as to the support plate 24 having a thickness of 0.8 mm. However, as illustrated in FIG. 7A, when attaching the sliding bearing 10 to the support plate 24 having a thickness of 1.2 mm, the sliding bearing 10 is diagonally inserted into the through-hole 24a of the support plate 24 at a slightly steeper angle than in a case of the support plate 24 having a thickness of 0.8 mm.

Next, as illustrated in FIG. 7B, the recess 30e of the tubular portion 30 is pushed upward, so that the sliding bearing 10 is rotated and pressed into the through-hole 24a around the fulcrum 30f at the boundary between the straight surface 30b and the rounded surface 30c, which are located below the engagement portion 34. At this time, as compared with the case of attaching the sliding bearing 10 to the support plate 24 having a thickness of 0.8 mm, the fulcrum 30f can be moved to a position that is displaced upward from the lower surface of the support plate 24, since in the sliding bearing 10 according to the first exemplary embodiment, a lower part of the outer peripheral surface of the tubular portion 30 below the engagement portion 34 is the rounded surface 30c. Accordingly, the sliding bearing 10 can be appropriately rotated and inserted also into the support plate 24 having a thickness of 1.2 mm.

As illustrated in FIG. 7C, when the sliding bearing 10 is inserted in the through-hole 24a, the inner peripheral surface of the through-hole 24a is pressed by the protruding portion 36 due to the elasticity of the claw-like portion 44 as in the case when the sliding bearing 10 is attached to the support plate 24 having a thickness of 0.8 mm. Thus, accidental removal of the sliding bearing 10 from the through-hole 24a can be reliably prevented. In this way, the sliding bearing 10 can be appropriately attached to support plates 24 having different thicknesses.

As described above, with the first exemplary embodiment, the sliding bearing 10 can be easily and stably inserted in the through-hole 24a of the support plate 24.

With the first exemplary embodiment, the claw-like portion 44 is elastically deformable. After having been inserted in the through-hole 24a of the support plate 24, the sliding bearing 10 can be removed from the through-hole 24a and reattached to the through-hole 24a. That is, the sliding bearing 10 can be reused and reattached.

In the first exemplary embodiment, substantially the entire surface of the outer side of the claw-like portion 44 is the protruding portion 36. However, this is not a limitation. The shape of the protruding portion 36 may be changed as necessary. For example, one or more protruding portions 36, each having a rib-like shape extending in the axial direction of the tubular portion 30, may be formed on the outer side of the claw-like portion 44.

Second Exemplary Embodiment

Next, referring to FIG. 8, a sliding bearing 10 according to a second exemplary embodiment of the present disclosure will be described. The second exemplary embodiment differs from the first exemplary embodiment in the shape of the protruding portion and in that the second exemplary embodiment does not have the claw-like portion. In other respects, the second exemplary embodiment is the same as the first exemplary embodiment. Therefore, elements of the second exemplary embodiment the same as those of the first exemplary embodiment will be denoted by the same reference numerals and similar descriptions will be omitted or simplified.

Figure 8:
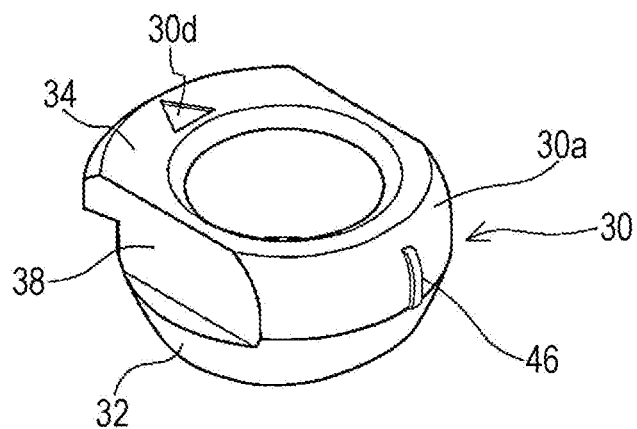
FIG. 8 illustrates a sliding bearing according to a second exemplary embodiment of the present disclosure.

As illustrated in FIG. 8, the sliding bearing 10 according to the second exemplary embodiment includes a tubular portion 30 having two D-cut surfaces 38 that face in opposite directions. At one end portion of the tubular portion 30, D-shaped flange portions 32, each of which protrudes outward from a corresponding one of the D-cut surfaces 38, are formed. At the other end portion of the tubular portion 30, an engagement portion 34, having an arc-shape and protruding outward from the outer peripheral surface of the tubular portion 30, is formed at a circumferential position that is outside the regions in which the D-cut surfaces 38 are formed. A protruding portion 46 is formed on the outer peripheral surface of the tubular portion 30 at a circumferential position that is opposite to the engagement portion 34. In the second exemplary embodiment, the protruding portion 46 has a rib-like shape extending in the axial direction of the tubular portion 30. In the second exemplary embodiment, the protruding height of the protruding portion 46 is, for example, in the range of 0.05 to 0.1 mm, and the width of the protruding portion 46 is, for example, in the range of 0.05 to 0.1 mm.

When attaching the sliding bearing 10 according to the second exemplary embodiment to the through-hole 24a of the support plate 24, as in the first exemplary embodiment, the engagement portion 34 is made to engage with the edge of the through-hole 24a, and the sliding bearing 10 is rotated and inserted into the through-hole 24a. At this time, the protruding portion 46 is compressed by the inner peripheral surface of the through-hole 24a, and the tubular portion 30 of the sliding bearing 10 is pressed into the through-hole 24a. That is, when the sliding bearing 10 is inserted in the through-hole 24a of the support plate 24, the inner peripheral surface of the through-hole 24a is pressed by the protruding portion 46. Thus, accidental removal of the sliding bearing 10 from the through-hole 24a can be reliably prevented. Since only the protruding portion 46 is compressed when inserting the sliding bearing 10 into the through-hole 24a, a force needed to insert the sliding bearing 10 is smaller than that for existing press-fit sliding bearings, which need to be pressed into a through-hole by compressing the entirety of the outer peripheral surface of the tubular portion. Accordingly, the sliding bearing 10 can be easily inserted in the through-hole 24a of the support plate 24.

If, for example, the protruding portion 46 is formed on one of the D-cut surfaces 38, the shape of the inner peripheral surface of the tubular portion 30 might become deformed when the inner peripheral surface of the through-hole 24a compresses the protruding portion 46, due to the thickness of a part of the tubular portion 30 in which the D-cut surface 38 is formed is small. In contrast, in the second exemplary embodiment, the protruding portion 46 is formed at a circumferential position that is outside the regions in which the D-cut surfaces 38 are formed, that is, at a circumferential position where the tubular portion 30 has a large thickness and is curved outward. Therefore, the shape of the inner peripheral surface of the tubular portion 30 is affected only negligibly. Accordingly, the sliding bearing 10 can rotatably support the shaft of a rotational body, such as a transport roller, appropriately.

As described above, with the second exemplary embodiment, as with the first exemplary embodiment, the sliding bearing 10 can be easily and stably inserted in the through-hole 24a of the support plate 24.

Figure 9:
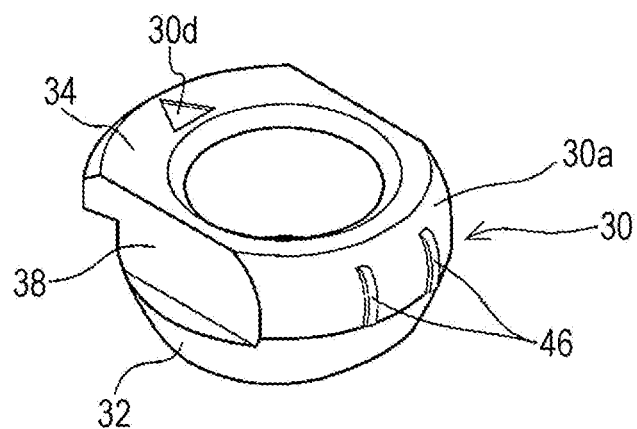
FIG. 9 illustrates a sliding bearing according to a modification of the second exemplary embodiment of the present disclosure.
Figure 10A:
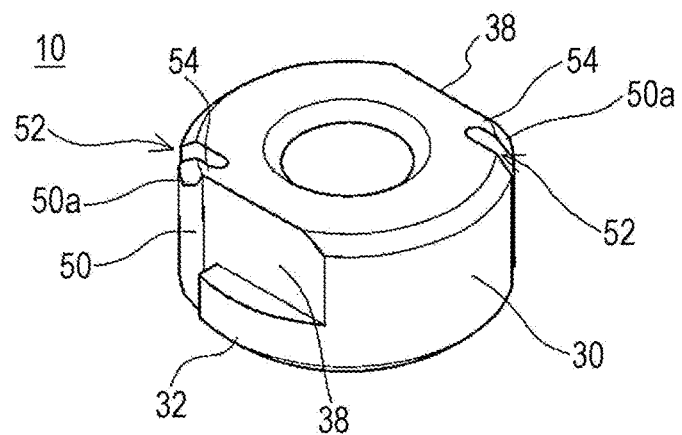
FIG. 10A is a perspective view.
Figure 10B:
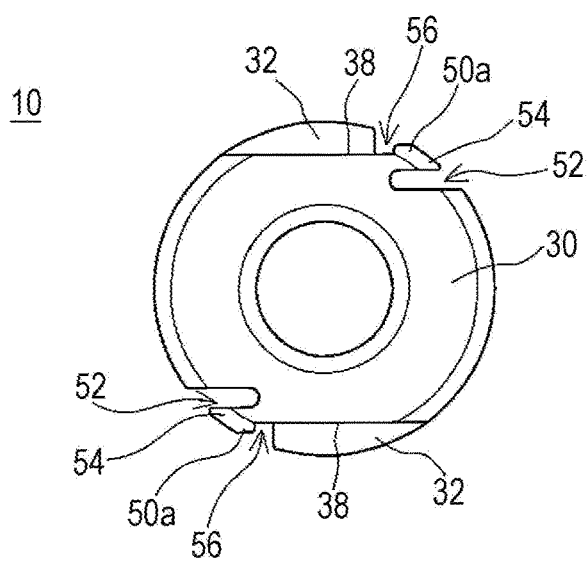
FIG. 10B is a planar view.
Figure 10C:
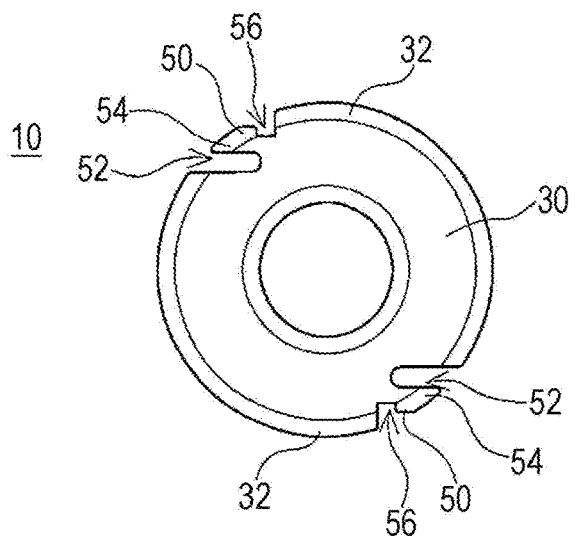
FIG. 10C is a bottom view of a sliding bearing according to a third exemplary embodiment of the present disclosure.
Figure 11A:
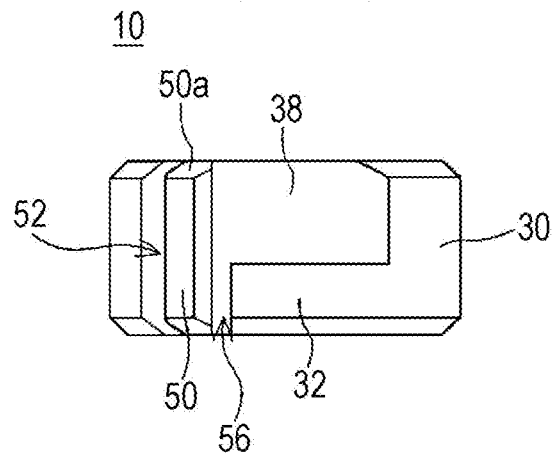
FIG. 11A is a front view.
Figure 11B:
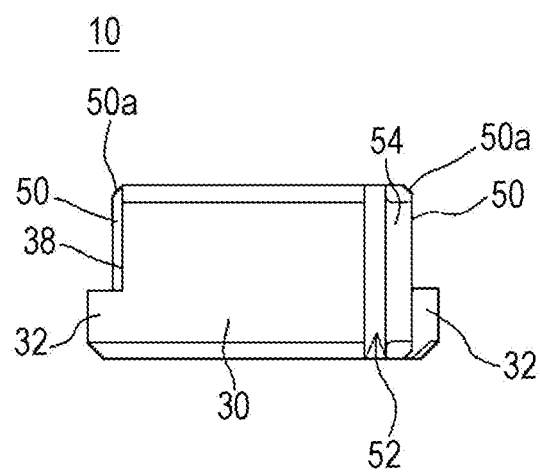
FIG. 11B is a right side view of the sliding bearing according to the third exemplary embodiment of the present disclosure.
Figure 12A:
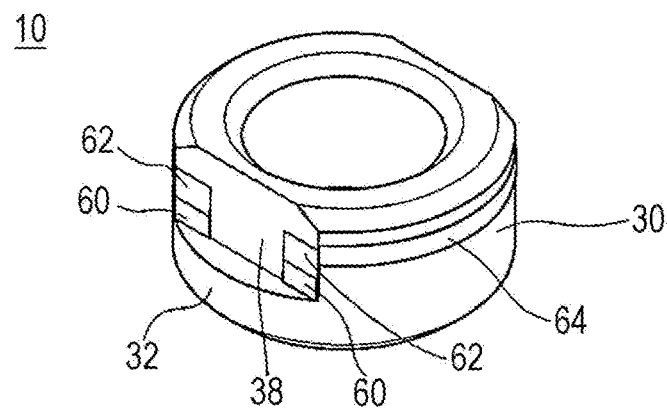
FIG. 12A is a perspective view.
Figure 12B:
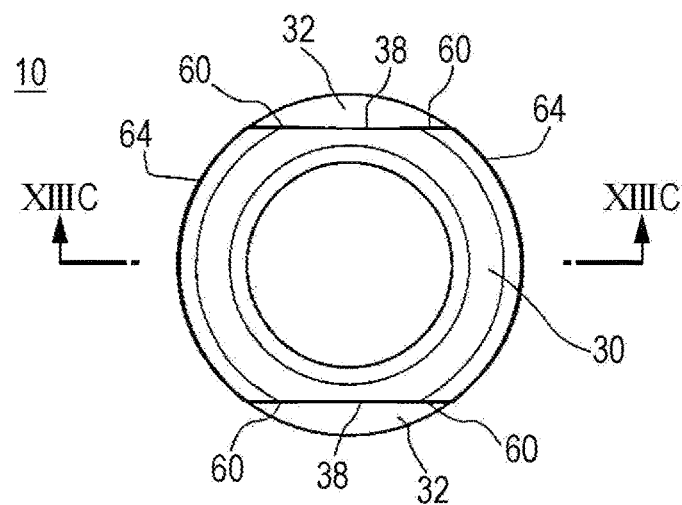
FIG. 12B is a planar view.
Figure 12C:
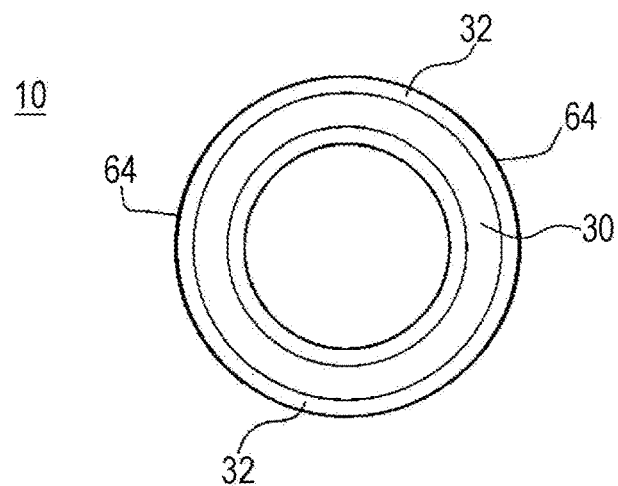
FIG. 12C is a bottom view of a sliding bearing according to a fourth exemplary embodiment of the present disclosure.
Figure 13A:
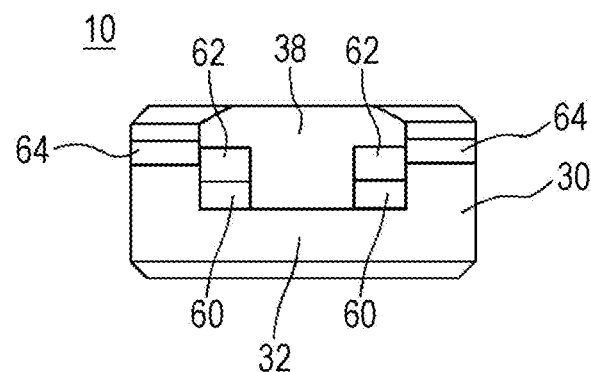
FIG. 13A is a front view.
Figure 13B:
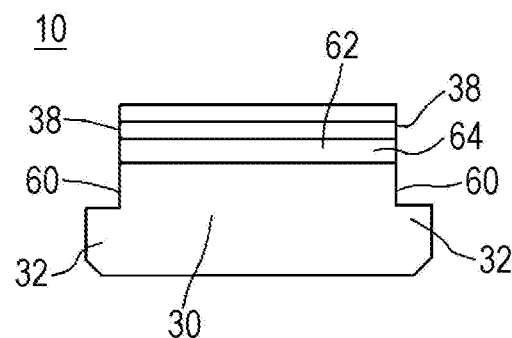
FIG. 13B is a right side view.
Figure 13C:
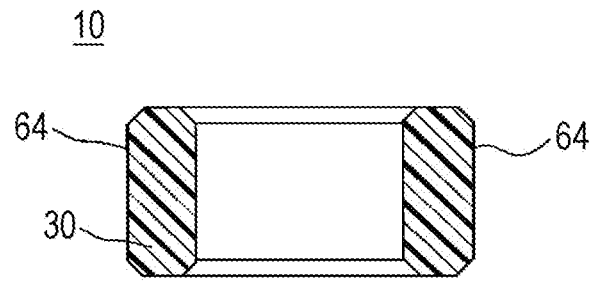
FIG. 13C is a cross-sectional view taken along line XIIIC-XIIIC of FIG. 12B of the sliding bearing according to the fourth exemplary embodiment of the present disclosure.

In the second exemplary embodiment, one protruding portion 46 is formed at a circumferential position opposite to the engagement portion 34. However, the number of protruding portions 46, the shape(s) of the protruding portion(s) 46, and the position(s) of the protruding portion(s) 46 may be changed, as necessary. For example, as illustrated in FIG. 9, a plurality of (in FIG. 9, two) protruding portions 46 may be formed at circumferential positions opposite to the engagement portion 34, which are spaced apart from each other by a predetermined distance in the circumferential direction. The protruding portion 46 may include, for example, one or more hemispherical protrusions.

Third Exemplary Embodiment

Next, referring to FIGS. 10A to 11B, a sliding bearing 10 according to a third exemplary embodiment of the present disclosure will be described. The third exemplary embodiment differs from the first exemplary embodiment in the shape of the claw-like portion, including the protruding portion, and the direction in which the claw-like portion elastically deforms. In other respects, the third exemplary embodiment is the same as the first exemplary embodiment. Therefore, elements of the third exemplary embodiment the same as those of the first exemplary embodiment will be denoted by the same reference numerals and similar descriptions will be omitted or simplified.

As illustrated in FIGS. 10A to 11B, the sliding bearing 10 according to the third exemplary embodiment includes a tubular portion 30 having two D-cut surfaces 38 that face in opposite directions. At one end of the tubular portion 30 in the axial direction, D-shaped flange portions 32, each of which protrudes outward from a corresponding one of the D-cut surfaces 38, are formed.

Protruding portions 50 are each formed at one end portion of a corresponding one of the D-cut surfaces 38 in a direction perpendicular to the axial direction of the tubular portion 30. The protruding portions 50 extend in the axial direction of the tubular portion 30. In the third exemplary embodiment, each of the protruding portions 50 is formed on a corresponding one of the D-cut surfaces 38, and the protruding portions 50 are disposed point-symmetric to each other about the axial of the tubular portion 30. In the tubular portion 30, slits 52 are formed on the back side of the protruding portions 50. The slits 52 extend along the D-cut surfaces 38 over the entire length of the tubular portion 30 in the axial direction. Claw-like portions 54 are formed between the slits 52 and the D-cut surfaces 38. The claw-like portions 54, including the protruding portions 50, are elastically deformable in the circumferential direction of the tubular portion 30. In other words, the tubular portion 30 includes the claw-like portions 54 (elastic pieces) on parts of the outer peripheral portion thereof; the claw-like portions 54 stand in a horizontal direction, that is, in a direction parallel to the D-cut surfaces 38 and perpendicular to the axial direction of the tubular portion 30. The protruding portions 50 are formed on parts of the claw-like portions 54 near the D-cut surfaces 38. The protruding height of each of the protruding portions 50 from the D-cut surfaces 38 is, for example, 0.3 mm. The protruding portions 50 press the inner peripheral surface of the through-hole 24a of the support plate 24, thereby preventing accidental removal of the sliding bearing 10 from the through-hole 24a.

Predetermined spaces 56 are formed between the flange portions 32 and the protruding portions 50 in the circumferential direction of the tubular portion 30. With the spaces 56, the claw-like portions 54 can elastically deform easily in the circumferential direction of the tubular portion 30. Chamfered portions 50a, each having a chamfered surface or a rounded surface, are each formed at an upper end portion of a corresponding one of the protruding portions 50, that is, at an end portion of the protruding portion 50 opposite to the flange portion 32 in the axial direction of the tubular portion 30.

Although not illustrated, when attaching the sliding bearing 10 according to the third exemplary embodiment to the through-hole 24a of the support plate 24, the sliding bearing 10 is straightly pushed into the through-hole 24a of the support plate 24 in such a way that an upper end portion of the tubular portion 30 passes through the through-hole 24a first, until the upper surfaces of the flange portions 32 contact the lower surface of the support plate 24. At this time, upper end portions of the protruding portions 50 contact the edge of the through-hole 24a. However, since the chamfered portions 50a are formed on the upper end portions of the protruding portions 50, a force that the edge of the through-hole 24a applies to the chamfered portions 50a acts in the circumferential direction, and the claw-like portions 54 elastically deform naturally in the circumferential direction (toward the inside of the through-hole 24a). After the chamfered portions 50a of the protruding portions 50 have passed through the through-hole 24a, the protruding portions 50 are pressed by the inner peripheral surface of the through-hole 24a, and the claw-like portions 54 elastically deform by an amount corresponding to the protruding height of the protruding portions 50 in the circumferential direction of the tubular portion 30. When the sliding bearing 10 is inserted in the through-hole 24a of the support plate 24, the inner peripheral surface of the through-hole 24a is pressed by the protruding portions 50 due to the elasticity of the claw-like portions 54. Thus, accidental removal of the sliding bearing 10 from the through-hole 24a can be reliably prevented.

Thus, when attaching the sliding bearing 10 to the through-hole 24a of the support plate 24, it is only necessary to push the sliding bearing 10 straightly into the through-hole 24a, and the force needed for insertion is only a force for elastically deforming the claw-like portion 54. Accordingly, the sliding bearing 10 can be easily inserted in the through-hole 24a of the support plate 24.

The claw-like portions 54 only elastically deform in the outer peripheral portions of the tubular portion 30, and the shape of the inner peripheral surface of the tubular portion 30 is not affected by the elastic deformation of the claw-like portions 54. Accordingly, the sliding bearing 10 can rotatably support the shaft of a rotational body, such as a transport roller, appropriately.

As described above, with the third exemplary embodiment, the sliding bearing 10 can be easily and stably inserted in the through-hole 24a of the support plate 24. In particular, the claw-like portions 54 can elastically deform in the circumferential direction of the tubular portion 30, even if there are dimensional errors, backlash of the sliding bearing 10 in the circumferential direction of the tubular portion 30 can be appropriately prevented. Moreover, the protruding portions 50 and the claw-like portions 54 are disposed point-symmetric to each other about the axial of the tubular portion 30, the sliding bearing 10 can be inserted in the through-hole 24a of the support plate 24 in a well-balanced way.

With the third exemplary embodiment, the claw-like portion 54 is elastically deformable. After having been inserted in the through-hole 24a of the support plate 24, the sliding bearing 10 can be removed from the through-hole 24a and reattached to the through-hole 24a. That is, the sliding bearing 10 can be reused.

In the third exemplary embodiment, the protruding portion 50 is formed on each of the D-cut surfaces 38. However, the protruding portion 50 may be formed on only one of the D-cut surfaces 38. The shape(s) of the protruding portion(s) 50 may be changed as necessary.

Fourth Exemplary Embodiment

Next, referring to FIGS. 12A to 13C, a sliding bearing 10 according to a fourth exemplary embodiment of the present disclosure will be described. The fourth exemplary embodiment differs from the third exemplary embodiment in the shape of the protruding portion and in that the fourth exemplary embodiment does not have the claw-like portion. In other respects, the fourth exemplary embodiment is the same as the third exemplary embodiment. Therefore, elements of the fourth exemplary embodiment the same as those of the third exemplary embodiment will be denoted by the same reference numerals and similar descriptions will be omitted or simplified.

As illustrated in FIGS. 12A to 13C, the sliding bearing 10 according to the fourth exemplary embodiment includes a tubular portion 30 having two D-cut surfaces 38 that face in opposite directions. At one end portion of the tubular portion 30, D-shaped flange portions 32, each of which protrudes outward from a corresponding one of the D-cut surfaces 38, are formed.

Protruding portions 60 are formed at both ends of each of the D-cut surfaces 38 in a direction perpendicular to the axial direction of the tubular portion 30. The protruding portions 60 extend in the axial direction of the tubular portion 30. In the fourth exemplary embodiment, the protruding portions 60 each have a thin plate-like shape. The protruding portions 60 are formed on each of the D-cut surfaces 38. The protruding portions 60 are disposed point-symmetric to each other about the axial of the tubular portion 30. In the fourth exemplary embodiment, the protruding height of each of the protruding portions 60 from the D-cut surface 38 is, for example, 0.05 mm; and the width of each of the protruding portions 60 (the length of each of the protruding portions 60 in a direction perpendicular to the axial direction of the tubular portion 30) is, for example, 0.7 mm.

Tapered portions 62, whose thickness gradually increases toward the lower ends thereof, are disposed above the protruding portions 60. The outer surface of a lower part of each of the tapered portions 62 is flush with the outer surface of an upper part of a corresponding one of the protruding portions 60.

In upper parts of the tubular portion 30, second protruding portions 64 are formed at circumferential positions that are outside the regions in which the D-cut surfaces 38 are formed. Each of the second protruding portions 64 has a thin belt-like shape and extends in the circumferential direction. The second protruding portion 64 has a tapered shape such that the thickness of the second protruding portion 64 gradually increases toward the lower end thereof. The protruding height of the lower end of the second protruding portion 64 from the D-cut surface 38 is, for example, 0.05 mm. The width of the second protruding portion 64 (the length in the axial direction of the tubular portion 30) is, for example, 0.7 mm. The second protruding portions 64, having such a shape, restrict movement of the sliding bearing 10 in the axial direction. However, the second protruding portions 64 may be omitted.

Although not illustrated, when attaching the sliding bearing 10 according to the forth exemplary embodiment to the through-hole 24a of the support plate 24, the sliding bearing 10 is straightly pushed into the through-hole 24a of the support plate 24 in such a way that an upper end portion of the tubular portion 30 passes through the through-hole 24a first, until the upper surfaces of the flange portions 32 contact the lower surface of the support plate 24. That is, the second protruding portion 64 is made to pass through the through-hole 24a, and the protruding portions 60 are made to contact the inner peripheral surface of the through-hole 24a. At this time, the protruding portions 60 are compressed by the inner peripheral surface of the through-hole 24a, and the tubular portion 30 of the sliding bearing 10 is pressed into the through-hole 24a. That is, when the sliding bearing 10 is inserted in the through-hole 24a of the support plate 24, the inner peripheral surface of the through-hole 24a is pressed by the protruding portions 60. Thus, accidental removal of the sliding bearing 10 from the through-hole 24a can be reliably prevented.

Since only the protruding portions 60 are compressed when inserting the sliding bearing 10, a force needed to insert the sliding bearing 10 is smaller than that that for inserting exiting sliding bearings, which need to be pressed into a through-hole by compressing the entirety of the outer peripheral surface of the tubular portion. Since the second protruding portions 64 are tapered and the protruding height of the second protruding portions 64 is small, the second protruding portions 64 can be made to pass through the through-hole 24a easily. Accordingly, the sliding bearing 10 can be easily inserted in the through-hole 24a of the support plate 24.

When the protruding portions 60 are formed on the D-cut surfaces 38, the shape of the inner peripheral surface of the tubular portion 30 might become deformed when the inner peripheral surface of the through-hole 24a compresses the protruding portions 60. However, in the fourth exemplary embodiment, the protruding portions 60 are formed on end portions of the D-cut surface 38 in a direction perpendicular to the axial direction of the tubular portion 30. That is, the protruding portions 60 are formed on parts of the tubular portion 30 where the thickness of the tubular portion 30 is not so small, and the protruding height of the protruding portions 60 is small. Therefore, the shape of the inner peripheral surface of the tubular portion 30 is only negligibly affected. Accordingly, the sliding bearing 10 can rotatably support the shaft of a rotational body, such as a transport roller, appropriately.

As described above, with the fourth exemplary embodiment, the sliding bearing 10 can be easily and stably inserted in the through-hole 24a of the support plate 24.

In the fourth exemplary embodiment, the protruding portions 60 are formed at both end portions of each of the D-cut surfaces 38 in a direction perpendicular to the axial direction of the tubular portion 30. However, a protruding portion 60 may be formed only at one end portion of each of the D-cut surfaces 38. However, also in this case, the protruding portions 60 may be disposed point-symmetric to each other about the axial of the tubular portion 30. In the fourth exemplary embodiment, the protruding portions 60 are formed on each of the D-cut surfaces 38. However, the protruding portion(s) 60 may be formed on only one of the D-cut surfaces 38. The shapes of the protruding portions 60 and the second protruding portions 64 may be changed as necessary.

In the exemplary embodiments described above, the tubular portion 30 has two D-cut surfaces 38. However, the tubular portion 30 may have only one D-cut surface 38 or three or more D-cut surfaces 38.

In the exemplary embodiments described above, the image forming apparatus 100, in which the sliding bearing 10 is used, is a multifunction peripheral that functions as a copier, a facsimile, a printer, and the like. However, the image forming apparatus 100 may be a copier, a facsimile, a printer, or the like, or a multifunction peripheral that is a combination of at least two of above machines. The sliding bearing 10 can be used not only in a driving device of the image forming apparatus 100 but also in another driving device.

Moreover, numerical values, materials, and shapes described above are only examples, and may be changed as necessary in accordance with the specifications of products or the like.

The present disclosure contains subject matter related to that disclosed in Japanese Priority Patent Application JP 2016-123139 filed in the Japan Patent Office on Jun. 22, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sliding bearing inserted in a through-hole and made of a resin, the through-hole formed in a support plate, the sliding bearing comprising:
   a tubular portion including an outer peripheral surface, the outer peripheral surface including a D-cut surface;
   a flange portion formed at one end portion of the tubular portion and protrudes from the D-cut surface;
   an engagement portion protruding from a part of the outer peripheral surface of the tubular portion at another end portion of the tubular portion;
   a protruding portion formed on the outer peripheral surface of the tubular portion at a circumferential position, the circumferential position being outside a region in which the D-cut surface is formed and being outside a region in which the engagement portion is formed,
   wherein the tubular portion includes slits and a claw portion is formed between the slits
   the claw portion includes the protruding portion,
   the protruding portion extends from an outer surface of the claw portion, and
   wherein the claw portion is elastically deformable in a radial direction of the tubular portion.

2. The sliding bearing according to claim 1, wherein the circumferential position of the protruding portion is opposite to a circumferential position of the engagement portion.

3. The sliding bearing according to claim 1, wherein the protruding portion is a rib extending in an axial direction of the tubular portion.

4. An image forming apparatus comprising:
   a driving device comprising:
      a sliding bearing inserted in a through-hole and made of a resin, the through-hole formed in a support plate, the sliding bearing comprising:
         a tubular portion including an outer peripheral surface, the outer peripheral surface including a D-cut surface;
         a flange portion formed at one end portion of the tubular portion and protrudes from the D-cut surface:
         an engagement portion protruding from a part of the outer peripheral surface of the tubular portion at another end portion of the tubular portion:
         a protruding portion formed on the outer peripheral surface of the tubular portion at a circumferential position, the circumferential position being outside a region in which the D-cut surface is formed and being outside a region in which the engagement portion is formed,
         wherein the tubular portion includes slits and a claw portion is formed between the slits
         the claw portion includes the protruding portion,
         the protruding portion extends from an outer surface of the claw portion,
         wherein the claw portion is elastically deformable in a radial direction of the tubular portion, and
      a rotational body rotatably supported by the sliding bearing.

5. A sliding bearing inserted in a through-hole and made of a resin, the through-hole formed in a support plate, the sliding bearing comprising:
   a tubular portion including an outer peripheral surface, the outer peripheral surface including a D-cut surface;
   a flange portion formed at one end portion of the tubular portion and protrudes from the D-cut surface;
   an engagement portion protruding from a part of the outer peripheral surface of the tubular portion at another end portion of the tubular portion;
   a protruding portion formed on the outer peripheral surface of the tubular portion at a circumferential position, the circumferential position being outside a region in which the D-cut surface is formed and being outside a region in which the engagement portion is formed,
   wherein a part of the outer peripheral surface of the tubular portion, the part being located opposite to the engagement portion, has a rounded shape and defines a curve extending in the axial direction of the tubular portion.

6. The sliding bearing according to claim 5, wherein the circumferential position of the protruding portion is opposite to a circumferential position of the engagement portion.

* * * * *